United States Patent [19]

Self

[11] Patent Number: 5,110,495
[45] Date of Patent: * May 5, 1992

[54] ORGANIC PEROXIDE DISPERSIONS

[75] Inventor: James M. Self, Taylors, S.C.

[73] Assignee: ABCO Industries, Ltd., Roebuck, S.C.

[*] Notice: The portion of the term of this patent subsequent to Apr. 17, 2007 has been disclaimed.

[21] Appl. No.: 508,063

[22] Filed: Apr. 10, 1990

Related U.S. Application Data

[63] Continuation-in-part of Ser. No. 567,664, Jan. 3, 1984, Pat. No. 4,917,816.

[51] Int. Cl.$^5$ .................................................. C01B 15/055
[52] U.S. Cl. ........................... 252/186.26; 252/186.42; 252/95; 252/320; 252/358
[58] Field of Search .............. 252/186.26; 61/567, 61/664

[56] References Cited

U.S. PATENT DOCUMENTS

| | | | |
|---|---|---|---|
| 3,181,991 | 5/1965 | Leveskis | 502/160 |
| 3,182,026 | 5/1965 | Leveskis | 502/160 |
| 3,224,983 | 12/1965 | D'Alello | 521/88 |
| 3,470,114 | 9/1969 | Siggei et al. | 521/77 |
| 3,507,800 | 4/1970 | Leveskis | 502/160 |
| 3,884,844 | 5/1975 | Plungvian et al. | 521/44 |
| 3,920,589 | 11/1975 | Jacobs et al. | 521/113 |
| 4,016,112 | 4/1977 | Kajiura et al. | 521/85 |
| 4,028,289 | 6/1977 | Brown | 521/117 |
| 4,119,583 | 10/1978 | Filip et al. | 521/103 |
| 4,155,738 | 5/1979 | Boschosian | 252/186.26 |
| 4,255,277 | 3/1981 | Smearing | 252/186.26 |
| 4,396,527 | 8/1983 | Maysuyama et al. | 252/186.26 |
| 4,401,835 | 8/1983 | Tarasov | 252/186.26 |
| 4,402,853 | 9/1983 | Brocklehurst et al. | 252/186.26 |

OTHER PUBLICATIONS

"How to Thicken Liquids with CAB-O-Sil", Cabot Corp., Boston, Mass., brochure CTL2 564 SOM.
"BZQ-40, 40% Benzoyl Peroxide Pourable Paste", brochure by Witco Chemical Corp., Richmond, Calif.
"Development Data Sheet" CADOX BPO-W40, 40% Benzoyl Peroxide Suspension, by Noury Chemical Corp., Burt, N.Y., Mar. 5, 1982.

Primary Examiner—Robert L. Stoll
Assistant Examiner—Joseph D. Anthony
Attorney, Agent, or Firm—Dority & Manning

[57] ABSTRACT

Organic peroxide compositions that are available as sprayable dispersions, pourable dispersions, thick pastes and free flowing powder form, all of which may be characterized as slow burning and nonexplosive. Benzoyl peroxide compositions are preferred and may contain up to about 70 weight percent peroxide while viscosity of dispersions of same may be as low as about 100 centipoises when measured with a Brookfield RVT viscometer using a number 3 spindle at 50 rpm. Dispersions are produced in either low shear, impact-attrition type dispersion mills, exemplified by a Kady Mill, or high shear dispersion mills, exemplified by an Eppenbach Homo-Mixer.

16 Claims, 1 Drawing Sheet

ORGANIC PEROXIDE DISPERSIONS

This is a continuation-in-part of U.S. Ser. No. 567,664 filed Jan. 3, 1984 now U.S. Pat. No. 4,917,316.

BACKGROUND OF THE INVENTION

This invention relates to improved peroxide compositions which, depending upon the constituents of same, may be pourable or sprayable dispersions, powders or the like, and to a process for producing same.

Organic peroxides, primarily benzoyl peroxide, have been employed as catalysts for unsaturated polyester resin syrups, in spray up techniques, molding, mine bolt applications, and the like; in pharmaceutical compositions; and in general, paste applications where the peroxide is also a catalyst, as exemplified by use in reconstruction of automobile bodies. In particular, benzoyl peroxide has been widely utilized, in conjunction with organic plasticizers such as butyl benzyl phthalate or dibutyl phthalate, as catalysts in a "split batch" spray up application of polyester resin syrups. In the split batch process, a first resin syrup includes a catalyst promoter dissolved therein while a second, separate resin syrup has the benzoyl peroxide catalyst dissolved therein. The two resin syrups are independently pumped to the head of a spray gun where they are mixed and sprayed onto the receiving surface, per se, or in conjunction with a reinforcing medium such as chopped glass fibers. More recently, methyl ethyl ketone peroxide has been utilized as a low viscosity, sprayable liquid which obviated the split batch method and replaced same with a single resin syrup pump plus a pressurized catalyst pot. A small catalyst line delivers the methyl ethyl ketone peroxide to the spray head, and represents a much simplified spray up system, though the methyl ethyl ketone peroxide has a bad odor, is toxic, and is flammable.

It is likewise known in the art that the polyester products may be produced as low density foams or high density solid products by the presence or absence of blowing agents in the polymer mix. U.S. Pat. No. 3,224,983 to D'Alello, for example, describes the use of organic carbonates which, when heated, liberate carbon dioxide as a blowing agent for various thermoplastic resins along with a disclosure of lowering of the temperature at which carbon dioxide is liberated by an activator which may be an inorganic acid, base or salt exemplified by sodium carbonate and sodium bicarbonate. In like fashion, U.S. Pat. No. 3,470,114 to Siegel et al., discloses the preparation of foamed unsaturated polyesters wherein carbon dioxide is generated from an aromatic polycarbonate. Foamed unsaturated polyester products are also disclosed in U.S. Pat. Nos. 3,884,844; 3,920,589; 4,028,289; 4,016,112; and 4,119,583.

The prior patented art further discloses stable peroxide dispersions including dispersions of benzoyl peroxide which contain activated gels, including finely divided fumed silicas, exemplified by Cab-o-sil, a silica product manufactured by Cabot Corporation, Boston, Mass. that are activated in the process. The market for fumed silicas (such as Cab-o-sil) is 40-42 million lbs. in the United States and 80-100 million lbs. worldwide (source: U.S. Department of Commerce).

In addition to the above disclosures of the patented prior art, Witco Chemical, U.S. Peroxygen Division, 850 Morton Avenue, Richmond, Calif. 94804 and AKZO Chemical Corporation, Buffalo, N.Y. 14028 manufacture and market commercial suspensions or dispersions of benzoyl peroxide. The particular commercially available suspensions or dispersions of benzoyl peroxide, while analogous to the products of the present invention, are quite distinct from same as will become evident hereinafter. Notably, the Witco and AKZO products possess viscosity limitations not present with the products of the present invention and thus limit the applicability of same. Specifically, viscosity of the presently commercially available products fall in a range of about 2,000 centipoises up, while those of the present invention, as will be specifically described hereinafter, are available at viscosity levels in a range of from about 100 centipoises up. Furthermore, whereas the presently commercially available products are primarily classified by the Department of Transportation as hazardous due to the flammable and explosive nature of same, products according to the present invention are not so classified, and, in fact, in certain forms are not explosive and burn only very slowly. Still further, due to the viscosity limitations of the prior art products, the amount of benzoyl peroxide present in the dispersions has likewise been limited at an upper level somewhere in the neighborhood of 50 to 55 percent by weight, whereas with present products, the concentration of peroxide may be up to about 70 weight percent.

It will thus be readily ascertainable from the following description that products according to the present invention as well as the process for producing same will greatly modify utilization of organic peroxide products. Since the products are not classified as hazardous materials, restrictions will not exist as to the quantity in a single package; the transportation requirements for same; the handling of same in the plant; and the like. Moreover, utilization of products according to the present invention will primarily replace methyl ethyl ketone peroxide catalysts, which are highly toxic, flammable, etc. as catalysts for unsaturated polyester resin syrups. Though the prior art is replete with disclosures of uses to which the present compositions may be employed as well as to the individual disclosed constituents of the compositions, there is no teaching or suggestion in any known prior art as to the present process for production of peroxide dispersions nor to the particular improved products produced thereby.

SUMMARY OF THE INVENTION

It is an object of the present invention to provide an improved dispersion of an organic peroxide in water.

Another object of the present invention is to provide a low viscosity, sprayable benzoyl peroxide dispersion in water.

Yet another object of the present invention is to provide an improved benzoyl peroxide dispersion, the viscosity of which may vary to permit the dispersion to be sprayed or utilized as a thickened paste depending upon a particular end use, and without explosive hazard.

Still further, another object of the present invention is to provide an improved organic peroxide dispersion in water that will not explode, burn or pollute the surroundings.

Yet another object of the present invention is to provide an improved aqueous dispersion of benzoyl peroxide which upon drying will not create a fire or explosive hazard.

Still another object of the present invention is to provide an improved process for the production of aqueous dispersions of organic peroxides.

Still a further object of the present invention is to provide a process for the production of very fine particle size benzoyl peroxide powder.

Generally speaking, organic peroxide dispersions, according to teachings of the present invention, comprise an organic peroxide in particulate form in a range of from about 35 to 70 percent by weight of the dispersion; water; and a dispersant that creates an ionic region around the peroxide particles, is inert to the peroxide, and is at least water dispersible and which will permit the attainment of the dispersion viscosity as low as about 100 centipoises as determined by a Brookfield RVT viscometer at 25 degrees centigrade using a number 3 spindle at 50 revolutions per minute.

More specifically, the basic peroxide dispersion as set forth above may likewise include a number of further ingredients to permit the dispersion to be utilized for particular end uses and to impart certain desirable characteristics thereto. By way of example, a defoamer is normally included to reduce the incidence of foaming of the dispersion and is preferably present for most end uses. Further, the inclusion of a water soluble inorganic salt in the dispersion renders the suspension or dispersion stable, and retains the peroxide in suspension. Such salts which must be stable as to the peroxide may include sodium chloride, potassium chloride, calcium chloride, aluminum chloride and most other chloride salts except those of the transition metals which will cause the peroxide to decompose. Also, the soluble phosphate and sulfate salts of the group I, II and III metals are also generally acceptable.

Dispersions of organic peroxides according to the present invention when utilized as catalyst for unsaturated polyester resins or monomers may also include carbonate or bicarbonate salts of the group I, II or III metals whereby a variance of the amount of catalyst employed will produce a low density, foamed or a high density polymer product. The carbonate or bicarbonate salts liberate carbon dioxide which serves as a blowing agent for the polyester or the like to foam same when present in adequate quantity.

Acidic inorganic salts may also be included in the dispersion, attributing a number of beneficial aspects thereto. Specifically, such salts, exemplified by $NaH_2PO$, $Na_2HPO_4$, $NaHSO_4$ and $AlCl_3$ increase specific gravity of the water phase and thereby decrease settling propensity of the peroxide; act as a fire retardant for the peroxide in suspension; serve as a humectant whereby the rate of water evaporation from the dispersion is reduced; and retain the water of hydration after drying of the dispersion to negate any fire hazard that is normally experienced with the dry peroxides. As to the particular inorganic salts, sodium dihydrogen phosphate and sodium hydrogen phosphate are particularly beneficial for, in addition to the above attributes, these particular phosphates serve as natural buffers for the system and maintain pH in a range of about 3 to about 8, and act as sequesterants, thereby reducing the likelihood of decomposition of the peroxide due to transition metal ions. Products according to the present invention may be employed, without danger of fire or explosive hazard in spray up systems as catalysts for resin syrups; as thickened pastes in curing of resin syrups or pastes in mine bolt applications, in repair of structured elements or the like; as active ingredients in dermicidal and other pharmaceutical compositions, and the like.

In one embodiment, the process of producing dispersions according to the present invention generally comprises the steps of providing a mixture of the constituents for the dispersion, subjecting the mixture to a low shear, attrition type dispersion mill for a predetermined period of time, removing the resulting dispersion and degassing same.

More specifically, the predetermined constituents of the dispersion with the exceptions of the peroxide are preferably first blended in a low shear mixer after which the blend is added to a low shear attrition type dispersion mill. The particulate peroxide is then added to the blend in the dispersion mill and the mill is operated for a predetermined time to produce the desired dispersion. Viscosity of the dispersion is determined by the constituents and the time of operation of the dispersion mill. Thereafter, the dispersion is removed from the dispersion mill and is preferably degassed and filtered.

By utilization of the low shear, attrition type dispersion mill, preferably a Kady Mill, as described hereinafter, and a compound that produces an ionic region about the peroxide particles, viscosity can be controlled from a very low viscosity, e.g., about 100 centipoises to a very high viscosity, e.g., 15,000 centipoises or greater. At the low viscosities, the dispersion is sprayable in conventional spray equipment without damage or fouling, while at the higher viscosities, a thick paste results. For both type applications, as well as others in medium viscosity ranges, additional constituents may be added to the dispersion to stabilize the dispersion, reduce the flammable and explosive nature of the peroxide, even after drying of the dispersion, for foaming a polymer and the like.

In an alternative embodiment, the process of producing dispersions according to the present invention generally comprises the steps of providing a mixture of the constituents for the dispersion, blending all of the constituents in a low shear mixer, and subjecting the mixture to a high shear dispersion mill for a predetermined period of time. Here again, viscosity of the dispersion is determined by the constituents and the time of operation of the dispersion mill. Thereafter, the dispersion is removed from the dispersion mill and is preferably degassed and filtered.

Although the low shear attrition type Kady Mill mentioned above produces a higher quality dispersion in much less time, the utilization of a high shear dispersion mill, such as a Cowles Mill, or more preferably, an Eppenbach, in the present process yields an acceptable dispersion in accordance with the present invention.

DESCRIPTION OF THE PREFERRED EMBODIMENTS

Peroxide compositions according to the present invention may be employed in a number of different environs, realizing improvement in each, due to the nature and characteristics of the compositions. By way of example, the peroxides are well known as catalysts for polymerization of unsaturated polyester resins. Historically, the peroxide compositions of the prior art have been limited by their nature to particular techniques. Specifically as to benzoyl peroxide, which is a preferred peroxide according to the present teachings, the dispersions, suspensions, pastes or the like of the prior art have been very viscous. Employment of prior compositions in spray up techniques, for example, as mentioned hereinbefore, has required dual pumping systems, the result of which has led to the demise of the use of the benzoyl peroxide as a catalyst in spray up operations in favor of the liquid methyl ethyl ketone peroxides. While the methyl ethyl ketone peroxides are sprayable, the products are also very volatile, very toxic, very odoriferous and require solvent cleanup operations. Particularly the flammability and toxicity of the methyl ethyl ketone peroxides dictates stringent handling requirements for safe use. Similarly as to the peroxide compositions, the normal explosive nature of the same has previously required severe restrictions on transport of product, on the storage of product at the point use, and on the actual use of product in industrial operations. Not only do the flammability and explosive problems of the peroxides present real safety hazards, the restrictions on transport and storage also add severely to the economics of using same in any operation.

The peroxide products according to the present invention are not classified as hazardous chemicals due to the fact that they may be produced in a virtually nonflammable, nonexplosive form, even in a dry state. Declassification of the present peroxide compositions enables the compositions to be transported, stored and used without the restrictions placed on the prior art compositions, all leading to improved efficiency and use with attendant less expense. Not only, however, do compositions according to the present invention enjoy the aforementioned benefits, likewise the particular compositions may be manufactured in wide viscosity ranges to a point where they are now quite suitable for use in processes that were heretofore unavailable for peroxide dispersions.

Organic peroxides that may be suitably employed according to teachings of the present invention include solid peroxides that are dispersible in an aqueous medium as exemplified by benzoyl peroxide, lauroyl peroxide, di-cumyl peroxide, and di-cetyl peroxydicarbonate. Benzoyl peroxide is the preferred peroxide for use according to the present invention, and will be specifically discussed hereinafter as representative of the genus.

Depending upon the overall composition of the peroxide products according to the present invention, different uses may be made of same. Dispersions or suspensions of the peroxide may range from very low viscosity, sprayable compositions for catalysis of unsaturated monomers, polyester resin syrups, etc. to very viscous dispersions in virtually paste form which likewise would be suitable for catalysis, but in molding operations, mine bolt securement, repair of structured elements in which the materials are poured or spread by hand or the like. Additionally, present compositions may be provided in which the peroxide is present in very finely divided powder form, while still characterized as non-hazardous from a standpoint of flammability and/or explosion.

While the use of organic peroxide compositions are alluded to as catalysts for unsaturated polyester resin syrups, it is likewise known to use peroxides as catalysts for polymerization of other monomers, copolymers, and the like in which ethylenic unsaturation is present, e.g., monomeric vinyl, acrylic, and styrene resins, polyester resins, and copolymers of same. Hereinafter, discussion of only the polyester resin syrup compositions are described though it is not intended that the present application be restricted thereto.

Unsaturated polyester resin syrups which may be catalyzed by the peroxide compositions of the present invention include unsaturated polyester resins having a copolymerizable monomer which contains a terminal vinyl group. The unsaturated polyester resin may be derived from the polyesterification of a polycarboxylic acid or a polycarboxylic acid anhydride with a polyol according to techniques well known to those skilled in the art. Since the polyester resin to be produced is unsaturated, the polycarboxylic acid or anhydride, the polyol, or both must contain at least one ethylenicly unsaturated bond in the structure. Exemplary of polycarboxylic acids and anhydrides which are suitable for use in production of the unsaturated polyesters include without limitation, phthalic acid, isophthalic acid, terephthalic acid, adipic acid, succinic acid, tetrahydrophthalic acid, tetrabromophthalic acid, maleic acid, fumaric acid, the anhydride of any of the aforementioned acids, and combinations thereof. Polyols suitable for use in preparation of the unsaturated polyester resins are exemplified by ethylene glycol, propylene glycol, butylene glycol, neopentyl glycol, diethylene glycol, dipropylene glycol, polyethylene glycol, polypropylene glycol, trimethylol ethane, trimethylol propane, pentaerythritol, hydroxy-alkyl esters of polycarboxylic acids and combinations thereof. As is well known to those skilled in the art, a slight stoichiometric excess of polyol is generally employed in preparation of the polyester resin to facilitate reaction between the polycarboxylic acid or anhydride and the polyol and to reduce the viscosity of the formed polyester resin.

A copolymerizable monomer is combinable with the unsaturated polyester resins to yield a liquid resin syrup containing a terminable vinyl group. Such monomers are exemplified by styrene, alpha-methyl styrene, o-chlorostyrene, vinyl toluene, acrylic acid, methacrylic acid, alkyl acrylates, alkyl methacrylates, divinyl benzene, diacrylates, dimethacrylates, triacrylates, trimethacrylates and combinations thereof. In general, the monomer may be provided in an amount which falls in a range of from about 20 to about 40 percent of the total weight of the resin syrup, and, when reacted with the unsaturated polyester resins, produces a cross-linked polymer structure. Further suitable copolymerizable monomers for the resin syrup include the reaction products of polyepoxides with acrylic or methacrylic acids, e.g., the reaction products of a polyol such as 2,2,bis-(4 hydroxyphenyl) propane with a glycidyl acrylate or methacrylate. Generally, if employed, this particular type of copolymerizable monomer, which is in effect a reaction product, is employed in lieu of a portion of the unsaturated polyester resin.

Figure 1:
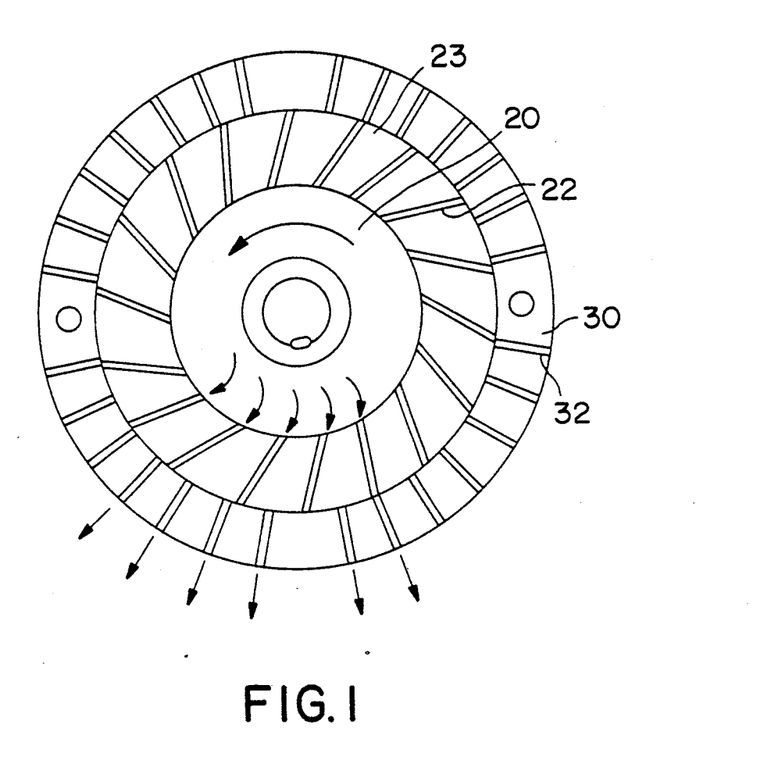
FIG. 1 is a schematic top plan view of a portion of the operation elements of a Kady Mill type dispersion unit.
Figure 2:
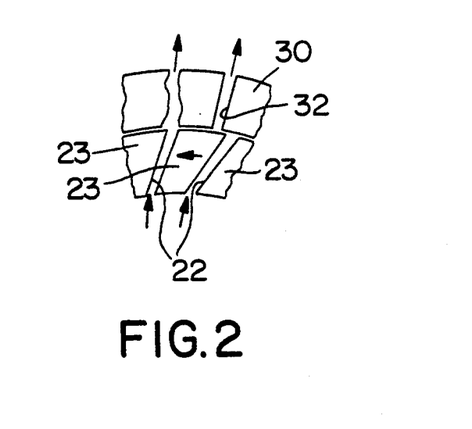
FIG. 2 is an enlarged view of a portion of FIG. 1.

In producing the peroxide containing compositions according to the present invention, certain of the procedures to which the constituents are subjected are quite important. In one embodiment, the constituents are subjected to low shear action in process equipment which through impact and/or attrition forces produces an aqueous dispersion of the peroxide. A Kady Mill manufactured by the Kinetic Dispersion Corporation is an example of such equipment. Generally speaking, and referring to FIGS. 1 and 2, in a Kady Mill dispersion unit, a rotor 20 having tangential slot-like structures 22 defined by the rotor blades 23 is rotatably located within a stationary annular stator 30 in which radial slots 32 are provided that have a small cross-section relative to their length. The constituents are added to the mill, enter the rotor which rotates at high speeds, e.g., 7500 to 15000 revolutions per minute, and material to be dispersed passes through the tangential rotor slots at high speed where they are abruptly stopped by the stationary side walls of the vertical stator slots and their direction is changed. Material enters the rotor-stator mechanism from top and bottom as shown in FIG. 1, generally being aided by low agitation propellers. After recirculating through the rotor-stator mechanism several times, the peroxide is attrited into very small particles and a proper dispersion is formed. The Kady Mill type dispersion avoids shear as much as possible and, in fact, does not rely upon close tolerance between milling surfaces such as colloid mills, ball and pebble mills, rolling mills and the like. Time of operation of the Kady Mill is the controlling factor since fixed clearances are built into the mill. Such type of apparatus is described in U.S. Pat. No. 2,706,621 to Laird, which is incorporated by reference herein. The Kady Mill is further specifically described in *Cost Engineering*, January 1967, pages 2 through 6.

Thus, one process for producing peroxide dispersions according to the present invention includes the steps of adding the particular constituents to be dispersed to a low shear impact dispersion unit such as the Kady Mill in which the dispersion is quickly achieved, e.g., generally in about three to about seven minutes. The dispersion is then removed from the Kady Mill, vacuum degassed and strained. Preferably, prior to introduction of the mixture to the dispersion mill, at least a portion of same is blended with a low shear mixer as exemplified by a jiffy mixer. Utilizing the low shear, impact dispersion mill, it was found that a mixture containing water, peroxide in powder or particulate form, and a defoamer became very viscous virtually as soon as the mill was started. When, however, a compound is added that produces an ionic atmosphere about the peroxide particles, is inert as to the peroxide, and is at least water dispersible, viscosities may be achieved as low as about 100 centipoises, measured with a Brookfield RVT viscometer, number 3 spindle at 50 revolutions per minute. Also, inspection with a microscope at 1,000 magnification indicated that all of the peroxide particles were less than 10 microns in size and that a vast majority of same were from about 2 to about 5 microns in size.

Alternatively, it has been found that peroxide containing compositions according to the present invention may also be produced by subjecting the constituents to high shear mixing, although foaming is a problem which must be addressed under such conditions. However, the Eppenbach Homo-Mixer manufactured by Gilford Wood, Hudson, N.H., yields a generally acceptable dispersion with minimal foaming. A Cowles mixer may also be used in accordance with the present process, but the foaming problem is greatly increased.

Other problems of high shear milling versus low shear attrition type milling include dispersed particle shape and size. While the peroxide particles dispersed by a Kady Mill are generally spheroidal in shape, high shear mixing produces irregularly shaped particles. Further, such irregular particles are on average not as small as those generated by low shear attrition and, moreover, have a broader particle size distribution. Another drawback of high shear mixing is the time required to produce a usable dispersion. While the Kady Mill yields a dispersion in accordance with the present invention within about three to seven minutes, a high shear Eppenbach mixer requires roughly one and one-half hours to produce a usable end product.

The high shear Eppenbach mill mixing head includes a turbine having turbine blades. The turbine is mounted adjacent a stationary stator. The stator defines restricted openings through which are forced, in a high shear operation, materials drawn up into the mixing head by the rotating turbine. By drawing material from the bottom of the mixing vessel, the Eppenbach avoids air entrapment which is common to propeller type mixers which create a vortex and pull air from the upper surface and into the material being processed.

However, although the configuration of the Eppenbach mixer tends to limit introduction of external air, as noted above, one inherent problem of high shear mixing is foaming. Foaming results when agglomerated particles which include occluded air are broken down in the high shear operation. Conversely, mixing by low shear attrition releases such occluded air without foaming. In the present process, the peroxide particles as received from the various suppliers generally have occluded air such that direct introduction thereof into a high shear mixing operation results in substantial foaming. Thus, it is critical that such foaming is decreased by preliminary low shear mixing. Accordingly, whereas the above discussed process preferably includes preliminary low shear mixing of all constituents except the peroxide, the present embodiment necessarily includes preliminary low shear mixing of all constituents including the peroxide.

By the present high shear process, viscosities may be achieved as low as about 100 centipoises, measured with a Brookfield RVT viscometer, number 3 spindle at 50 revolutions per minute. Also, inspection with a microscope at 1,000 magnification indicated that all of the peroxide particles were less than 20 microns in size and that a vast majority of same were from about 4 to about 10 microns in size.

Illustrative of the compounds which produce an ionic region about the particles and permit the viscosity control of the peroxide dispersions are pyrogenic or fumed silicas (Cab-o-sil silicas manufactured by Cabot Corporation), sodium salts of condensed naphthalene sulfonic acids (Tamol SN, manufactured by Rohm and Haas Company, Philadelphia, Pa.) and sodium salts of polymerized carboxylic acids (Tamol 731, manufactured by Rohm and Haas Company) which is also referred to as a sodium salt of a carboxylated polyelectrolyte. In selecting a particular dispersant for use in controlling viscosity of the dispersion, as mentioned above, same must be inert as to the peroxide. In this regard, any compound should be avoided that will, for example, cause the peroxide to decompose, as well as any dispersant in which the peroxide dissolves and promotes the formation of crystalline peroxide which is shock sensitive and explosive. The ionic region generating compounds may be present in the dispersions in a range of from about 1 to about 7 weight percent, preferably from about 3 to about 6. In generating the ionic atmosphere about the peroxide particles, particular dispersants, exemplified by those set forth above, are employed which supply ions to the area surrounding the peroxide particles. Ions, of course, are charged particles which, depending upon charge on adjacent particles, will create attractive or repulsive forces with respect thereto. The Tamol dispersants noted above are reported in the literature as surrounding the particle with a strong anionically charged electrical layer. It is believed that such charged electrical layer overcomes the attractive forces normally existing between the peroxide particles and keeps the particles separated.

Since benzoyl peroxide is the preferred peroxide for use according to the present invention, discussion hereinafter will be made with respect only to benzoyl peroxide with the understanding that other peroxides within the genus, would likewise be appropriate.

A dispersion of benzoyl peroxide, water, Cab-o-sil, and a defoamer will, in a short period of time, e.g., several days, not remain in the dispersed condition. The benzoyl peroxide particles will settle out, but when subjected to low shear agitation, will go back into suspension. In situations where resuspending of the particles will accomplish the intended result, the above dispersion may suffice. Should, however, it be desirable to produce a permanent dispersion or suspension, a soluble inorganic salt that is stable to the benzoyl peroxide may be added. Exemplary of such salts are sodium chloride, potassium chloride, and calcium chloride, as well as other chloride salts except those of the transition metals which would cause the benzoyl peroxide to decompose. Further exemplary of suitable salts are the soluble phosphate and sulfate salts of the Group I, II and III metals. Bromide and iodide salts should, however, be avoided.

Inclusion of further particular ingredients in the peroxide compositions, when utilizing same to catalyze unsaturated polyester resin syrups, permit the attainment of a high or a low density polymer product, depending upon the amount of the peroxide composition utilized. A blowing agent is included which liberates carbon dioxide, exemplified by carbonates and bicarbonates of groups I or II metals, e.g., calcium carbonate or calcium bicarbonate. Once sufficient catalyst is included to provide adequate blowing agent for foaming the polymers, foaming will occur proportional to the amount present.

A further class of acidic inorganic salts when dissolved in the water phase of the present peroxide compositions yields particularly important advantages. These salts are exemplified by $NaH_2PO_4$, $Na_2HPO_4$, $NaHSO_4$, or $AlCl_3$, with sodium dihydrogen phosphate and sodium hydrogen phosphate being preferred. The acidic inorganic salts (1) increase the specific gravity of the water phase which decreases the propensity of settling of the peroxide; (2) act as a fire retardant for the peroxide in suspension; (3) have a humectant effect on the dispersion which reduces the rate of water evaporation therefrom; and (4) if and when the dispersion dries down or the water is otherwise removed, retain water of hydration which significantly reduces the flammable and explosive nature of the dry peroxide. In addition, the preferred salts, serve as a buffer to maintain pH of the dispersion in a range of from about 3 to about 8, produce a sequestering effect on the dispersion thus reducing decomposition of the peroxide as a result of transition metal ions, and provide a flame retardant effect in both solution and solid form. These inorganic salts may be present in the dispersions in a range of from about 5 to about 20 weight percent, preferably about 14 to 18.

Additionally, other ingredients may be added to the dispersions for particular needs so long as no adverse effects are produced thereby. For example, a surfactant may be needed for catalysis of certain polyesters, etc. Likewise for foaming, cell stabilizers may be necessary or desirable. Furthermore, to control or stabilize the viscosity of the dispersion, additives such as guar gum or plasticizers may be included. Such added materials provide the further benefit of acting as lubricants for the moving parts of the spray-up apparatus.

A better understanding of the present invention will be had by referring to the following examples.

EXAMPLE 1

A mixture of 1500 grams of water, 100 grams of Cab-o-sil, a fumed silica product manufactured by Cabot Corporation and 60 grams of DC-B, a silicone based defoamer manufactured by Dow Corning, Midland, Mich. was added to a low shear mixer and mixed well. Thereafter, 1906 grams of Lucidol Division, Pennwalt Corp., Buffalo, N.Y., was added to the low shear mixer, mixed in and the mixture was allowed to stand 1 hour. The mixture was then placed in a Kady Mill dispersion unit which operated for 4.5 minutes, followed by vacuum degassing and straining through an 80 mesh strainer. Viscosity of the dispersion was measured with a Brookfield RVT viscometer using a number 3 spindle. At 5 rpm, a viscosity reading of 4600 cps. was obtained, while at 50 rpm the viscosity was 720 cps. After several days standing undisturbed, the benzoyl peroxide separated from the dispersion, though thereafter, went back into suspension with low shear agitation. Inspection with a microscope at 1000 magnification showed all benzoyl peroxide particles to be less than 10 microns, with a vast majority of same being a size of from about 2 to about 5 microns. The specific gravity of the dispersion was measured to be 1.158 and peroxide content at 40.9 percent by weight.

EXAMPLE 2

A mixture of 1200 grams of water, 80 grams of Cab-o-sil and 98 grams of DC-B defoamer were mixed well in a low shear mixer, after which 2567 grains of Lucidol BPO-78 were added with mixing continuing. The overall mixture was then placed in the Kady Mill which operated for three minutes, was removed from the Kady Mill, vacuum degassed and strained through an 80 mesh strainer. Viscosity of the dispersion using a number 4 spindle, measured 820 cps. at 100 rpm and 4400 cps. at 10 rpm. Specific gravity of the dispersion was determined to be 1.150 with 50.2 percent by weight peroxide solids present. The material appeared to be slightly foamed.

EXAMPLE 3

A mixture of 1550 grams water, 60 grams of Cab-o-sil and 80 grams of DC-120, a silicone based defoamer manufactured by Dow Corning were mixed well in a low shear mixer after which 4022 grams of Lucidol BPO-78 were added and mixed well. This mixture was then placed in the Kady Mill which operated for 7.5 minutes. The resulting dispersion was removed from the Kady Mill, vacuum degassed, and strained through an 80 mesh strainer. Viscosity was measured on a Brookfield RVT viscometer with a number 4 spindle to be 1500 cps. at 100 rpm and 6020 at 10 rpm. Specific gravity of the dispersion was measured at 1.200 with 55.03 percent peroxide solids present.

Examples 1 through 3 thus indicate preparation of various concentration peroxide dispersions.

EXAMPLES 4-8

Benzoyl peroxide (BPO) dispersions were produced on the Kady Mill at 35, 40, 45, 50 and 55 weight percent peroxide solids, utilizing proportionate amounts of water, Cab-o-sil and DC-B defoamer, with the Kady Mill being operated for three minutes in each case. Viscosity of each dispersion was measured with a Brookfield viscometer, and results are tabulated in Table I.

TABLE I

VISCOSITY OF BPO DISPERSIONS

| EXAMPLE NO. | | 4 | 5 | 6 | 7 | 8 |
|---|---|---|---|---|---|---|
| PERCENT BPO | | 35 | 40 | 45 | 50 | 55 |
| SPINDLE NUMBER | | 2 | 3 | 3 | 3 | 4 |
| | | | | VISCOSITY, CPS. | | |
| RVT ROTATION | 100 | 40 | 45 | 100 | 380 | 1500 |
| SPEED, RPM | 50 | 40 | 70 | 150 | 620 | 2800 |
| | 20 | 90 | 125 | 300 | 1200 | 6000 |
| | 10 | 120 | 200 | 500 | 2100 | 8000 |
| Pounds/Gallon | | 9.24 | 9.35 | 9.5 | 9.75 | 9.9 |

As can be seen from Table I, dispersion viscosities varied from 40 centipoises to 8000 centipoises, depending upon concentration of peroxide solids and the viscosity measurement technique. For a number 3 spindle at 50 revolutions per minute, viscosity ranged from 70 centipoises to 620 centipoises.

EXAMPLES 9–13

A quantity of sodium dihydrogen phosphate was added to each of the dispersions of Examples 4–8 to produce a 20 weight percent solution of same in the water phase. Viscosities of the dispersions were than measured. Results were tabulated in Table II.

TABLE II

VISCOSITY OF BPO—NaH$_2$PO$_4$ DISPERSION

| EXAMPLE NO. | | 9 | 10 | 11 | 12 | 13 |
|---|---|---|---|---|---|---|
| PERCENT BPO | | 35 | 40 | 45 | 50 | 55 |
| SPINDLE NO. | | 2 | 3 | 3 | 3 | 4 |
| | | | | VISCOSITY, CPS. | | |
| RVT, RPM | 100 | 60 | 90 | 200 | 810 | 2500 |
| | 50 | 64 | 140 | 300 | 1320 | 3500 |
| | 20 | 120 | 250 | 600 | 2600 | 7000 |
| | 10 | 200 | 400 | 1050 | 4700 | 1100 |
| POUNDS/GALLON | | 10.1 | 10.2 | 10.3 | 10.5 | 10.55 |

As can be seen from Table II, the addition of the sodium dihydrogen phosphate increased viscosities across the board.

EXAMPLES 14–19

A series of BPO dispersions were prepared containing the same percent BPO, DC-B defoamer and water while varying the level of Cab-o-sil. Each sample was prepared in exactly the same manner. The water, DC-B defoamer and Cab-o-sil were mixed. The BPO was mixed in slowly in the low shear mixer. The mixtures were subjected to the Kady Mill for an operating time of six minutes. Each sample was then vacuum degassed and strained. The base constituent mix included 1550 grams of water, 100 grams of DC-B defoamer, and 3200 grams BPO-78. The Cab-o-sil fumed silica was varied as shown in Table III with the attendant viscosity measurement for the dispersions.

TABLE III

EFFECT OF FUMED SILICA ON DISPERSION VISCOSITY

| EXAMPLE NO. | 14 | 15 | 16 | 17 | 18 | 19 |
|---|---|---|---|---|---|---|
| Cab-o-sil/grams | 0* | 25 | 50 | 75 | 100 | 150* |
| Spindle No/rpm | 5/F-4 × 10$^8$ | 3/5-8000 | 3/5-4800 | 3/5-5200 | 3/5-10000 | 5/B-3.4 × 10$^6$ |
| Viscosity in cps. | 1/F-2 × 10$^8$ | 3/10-5700 | 3/10-2800 | 3/10-2700 | 3/10-5700 | 2.5/B-5.3 × 10$^6$ |
| (Brookfield RVT) | | 3/20-4500 | 3/20-1650 | 3/20-1660 | 3/20-3500 | 1/B-12 × 10$^6$ |
| | | 3/50-2000 | 3/50-840 | 3/50-840 | 3/50-1660 | |
| | | | 3/100-500 | 3/100-535 | 3/100-990 | |

*Helipath unit utilized due to high viscosities.

As can be seen from Table III, viscosity followed a U-shaped curve. At 0 percent Cab-o-sil, the viscosity was very high, decreasing at 25, 50 and 75 gram levels, then increasing at 100 and 150 gram levels. Such was not predicted since Cab-o-sil is marketed as a product to increase viscosity.

EXAMPLES 19–24

Eight hundred grams of each of Examples 14–19 were mixed well at low shear with 150 grams of sodium dihydrogen phosphate. The samples were left overnight, then vacuum degassed, and viscosity of the dispersion measured. Results are tabulated in Table IV.

TABLE IV

EFFECT OF NaH$_2$PO$_4$ ON BPO DISPERSIONS

| EXAMPLE NO. | 19 | 20 | 21 | 22 | 23 | 24 |
|---|---|---|---|---|---|---|
| Cab-o-sil, grms. | 0 | 25 | 50 | 75 | 100 | 150 |
| Spindle No/rpm. | COULD | 5/A-3 × 10$^6$ | 3/5-10200 | 3/5-10000 | 5/5-20000 | 5/A-6 × 10$^6$ |
| Viscosity, cps. | NOT | 2.5/A-5.2 × 10$^6$ | 3/10-5500 | 3/10-5050 | 5/10-10800 | 2.5/A-12 × 10$^6$ |
| | PUMP | 1/A-15 × 10$^6$ | 3/20-3100 | 3/20-2800 | 5/20-6000 | 1/A-25 × 10$^6$ |
| | TOO | .5/A-.25 × 10$^6$ | 3/50-1500 | 3/50-1500 | 5/50-3400 | .5/A-44 × 10$^6$ |
| | VISCOUS | | 3/100-870 | 3/100-880 | 5/100-1600 | |

WEIGHT/GALLON OF ALL SAMPLES = 10.7–10.8 POUNDS

As can be seen from Table IV, the U-shaped curve continues to exist, though at a higher plateau.

EXAMPLE 25

The samples containing 25, 75 and 100 grams fumed-silica (Examples 15, 17 and 18) were mixed together with low shear for one hour. The mix was prepared to be comparable to the original formulation containing 72 grams. The viscosity of the resulting mix was measured with a number 4 spindle and indicated 1250 cps. at 100 rpm, 2200 cps. at 50 rpm, 3900 cps. at 20 rpm, 6800 cps. at 10 rpm, and 12350 cps. at 5 rpm. The samples containing 0 and 25 (Examples 14 and 15 grams fumed silica when inspected under the microscope showed the peroxide particles had been broken up and then reaggregated.

EXAMPLE 26

A dispersion containing 1550 grams of water, 100 grams of DC-B, and 2893 grams of Lucidol BPO-78 was prepared in a low shear mixer as set forth in Example 1. The mixture was then placed in the Kady Mill for a 1 minute operation. The mixture became so viscous that the mill would not grind. Examination under the microscope indicated reaggregation of the peroxide particles. Viscosity was tested with a RVT Helipath unit using Spindle F at 1 rpm and found to be $400 \times 10^6$ cps. Sixty grams of Cab-o-sil were slowly added to the viscous mix at low shear. Mix viscosity began to drop and the mix began to degas. After being mixed well the viscosity of the mix was determined by Brookfield RVT Spindle No. 4 to be 1500 cps. at 100 rpm, 2320 cps. at 50 rpm, 4900 cps. at 20 rpm and 8000 cps. at 10 rpm. The mixture was returned to the Kady Mill for an additional 3 minute operation, removed and degassed. Viscosity at 50 rpm was 4000 cps. Three hundred grams of Tamol SN was slowly mixed in well with low shear. Viscosity dropped to 2500 cps. at 50 rpm. The sample was then vacuum degassed and the viscosity measured using a number 3 spindle. Viscosity was 7200 cps. at 5 rpm, 4750 cps. at 10 rpm, 2150 cps. at 20 rpm, 1100 cps. at 50 rpm, and 650 cps. at 100 rpm. Again, it is seen that viscosity is, in part, controlled by the fumed silica and a sodium salt of condensed napthalene sulfuric acid.

EXAMPLES 27-33

A series of dispersions were produced with the constituents as specified in Example 16 with the exception that the level of benzoyl peroxide varied on a weight percent basis as set forth in Table V containing 35, 40, 45, 50, 55, 60 and 65 weight percent benzoyl peroxide. Viscosity of the dispersions was measured with a Brookfield viscometer. Results are tabulated in Table V.

TABLE V

| | VISCOSITY OF BENZOYL PEROXIDE DISPERSIONS | | | | | | |
|---|---|---|---|---|---|---|---|
| EXAMPLE NO. | 27 | 28 | 29 | 30 | 31 | 32 | 33 |
| BENZOYL PEROXIDE % | 35% | 40% | 45% | 50% | 55% | 60% (Heliapath) | 65% |
| Spindle/rpm- Visc., cps. | 2/100 = 120 | 3/100 = 200 | 3/100 = 350 | 3/100 = 500 | 5/100 = 1840 | D/5 14.8 × 10 | Semi-solid |
| | 2/50 = 144 | 3/50 = 280 | 3/50 = 520 | 3/50 = 820 | 5/50 = 3120 | D/25 23.6 × 10 | much like |
| | 2/20 = 240 | 3/20 = 175 | 3/20 = 900 | 3/20 = 1575 | 5/20 = 6400 | D/1 38.6 × 10 | molding |
| | 2/10 = 380 | 3/10 = 750 | 3/10 = 1500 | 3/10 = 2700 | 5/10 = 11800 | | clay |
| | 2/5 = 640 | 3/5 = 1200 | 3/5 = 2600 | 3/5 = 4650 | 5/5 = 20800 | | |

Similar viscosity pictures are presented as represented in the Examples set forth above.

EXAMPLE 34

A seventy percent by weight benzoyl peroxide dispersion was produced as described in Example 1. Thirty grams of water, and 29 grams of Tamol 731, a sodium salt of a polymerized carboxylic acid manufactured by Rohm and Haas were blended together. Thereafter, five hundred eighty eight grams of Lucidol BPO-78 were slowly added and mixed well with low shear into the blend. The mix wa then placed in the Kady Mill for 30 seconds operation. The sample was removed, cooled, degassed and Brookfield viscosity measured. Using a number 3 spindle, viscosities were 5600 cps. at 100 rpm, 8000 cps. at 50 rpm, 12000 cps. at 20 rpm, 16000 cps. at 10 rpm and 20000 cps. at 5 rpm. Solids content of the benzoyl peroxide was measured at 70.1 weight percent, thus indicating the feasibility of producing high concentrate peroxide dispersions.

EXAMPLE 35

Fifty grams of an unsaturated polyester resin (Owens-Corning Low Profile for boat spray-up) were mixed with 0.005 grams of N, N, dimethyl aniline. One gram of the benzoyl peroxide dispersion described in Example 1 was added and the constituents mixed for 60 seconds with low shear. The mixture did not gel in four hours. A slide of the liquid that was prepared and inspected under the microscope at 100 magnification showed that the benzoyl peroxide particles in the dispersion had reaggregated, and not dissolved in the polyester resin, thus negating the catalytic action of the peroxide.

EXAMPLE 36

Example 35 was repeated with the exception that one gram of Dow Corning 193 silicon fluid (a surfactant) was included. The resin gelled in 30 minutes, indicating the need for a surfactant for certain resins to assist in the dissolution of the peroxide catalyst.

EXAMPLE 37

A mixture was produced which included 1500 grams of water, 400 grams of Tamol SN, 500 grams of $NaH_2PO_4$, 50 grams of Cab-o-sil, and 25 grams of DC-B. The formulation was mixed well, and 4515 grams of Lucidol BPO-78 was slowly added with low shear, stirring continuing for two hours. Thereafter, the mix was placed in the Kady Mill which was operated for five minutes, removed, cooled, degassed and the Brookfield viscosity measured with a number 3 spindle. Dispersion viscosity was 450 cps. at 100 rpm, 720 cps. at 50 rpm, 1450 cps. at 20 rpm, and 2500 cps. at 10 rpm. Weight of the dispersion was 10.23 pounds per gallon with 50.4 weight percent peroxide solids present.

EXAMPLE 38

Two grams of the dispersion of Example 37 were mixed with 0.025 grams of N, N, dimethyl aniline. The sample slowly turned green, though no heat was generated. One hour later, the mixture was added to fifty grams of the unsaturated polyester resin of Example 35. Gelling of the resin occurred in 25 minutes.

EXAMPLE 39

Two grams of commercially available Cadox 40E, a 40 weight percent benzoyl peroxide dispersed in plasticizer produced by Noury was mixed thoroughly with 0.025 grams N,N, dimethyl aniline. The sample rapidly turned purple, and in about five minutes turned black. No exotherm was detected. One hour later the material was added to 50 grams of the unsaturated polyester resin of Example 35. The resin had not gelled in five hours, though a rubber-like gel occurred in about 15 hours.

EXAMPLE 40

One thousand grams of Alpha Resin Grade 80, Alpha Resin Collierville, Tenn. 38017 was blended with 400 grams CaCo$_3$ (Gamma Sperse 6532 from Georgia Marble, Tate, Ga. 30177) along with 1.4 grams of N,N Dimethyl aniline, and 14 grams of Dow Corning 193 surfactant. Fifty grams of the above formulation were mixed well with one gram of the benzoyl peroxide dispersion of Example 37. The resin gelled in approximately 20 minutes and was cured in 1 hour, indicating successful catalysis. Fifty grams of the resin formulation were also mixed well with one gram of the benzoyl peroxide dispersion of Example 12. The resin gelled in approximately 25 minutes, and was cured in approximately one hour with no significant increase in volume. Fifty grams of the resin formulation were mixed well with two grams of the peroxide dispersion of Example 12. The resin gelled in approximately 20 minutes, and was cured in approximately one hour with an increase in volume of approximately 50 percent, thus indicating some foaming. Fifty grams of the resin formulation were blended with five grams NaHCO$_3$ and one gram of the benzoyl peroxide dispersion of Example 12 was mixed with the resin system. The resin gelled in approximately 25 minutes and increased in volume of approximately 100 percent, indicating significant foaming.

EXAMPLE 41

Two 4 oz. paper cups were inverted revealing a circular cavity approximately 1¾ inches in diameter and ⅜ inch deep. The cavities were filled with the benzoyl peroxide dispersion of Example 37. The cup was placed on a concrete surface and set on fire. The paper cup burned up, though only a very small amount of the benzoyl peroxide dispersion appeared to burn, but without any ignition. A third cup was set aside to dry, with the dispersion (Example 37) in the circular cavity. The dispersion required seven days for evaporation of the water phase under laboratory conditions. When dry, the cup was set on fire on a concrete pad. The paper cup burned up and the dried benzoyl peroxide ignited and slowly burned. A fourth paper cup was inverted and filled with a commercial benzoyl peroxide powder, BPO-78 manufactured by Witco. The cup was set on fire. The cup burned and the peroxide burned in a flash.

EXAMPLE 42

A 300 gram sample of the benzoyl peroxide dispersion described in Example 37 (containing NaH$_2$PO$_4$) was placed on a porous paper towel. After standing under laboratory conditions for 24 hours, a very thick white paste was formed. The paste was placed in a glass beaker and 90 grams of Cab-o-sil fumed silica was blended therewith. With little blending the paste turned into a free-flowing powder, which was sieved through a 100 mesh screen. A small sample of about one gram of the peroxide powder was placed in an open flame where it burned slowly. A similar sized sample of commercial benzoyl peroxide powder, BPO-78, was placed in the flame and burned with a flash. This example illustrates the ability of producing a powder form of benzoyl peroxide which is not classified as flammable or explosive.

EXAMPLE 43

Benzoyl peroxide dispersion of Example 37 was placed in a Glasscraft Model 88 pressure pot catalyzer. A 5/16 inch catalyst line connected the pressure pot to a spray gun which was a Polycraft 505H with a standard Glasscraft Chopper mounted on the gun. Owens Corning Fiberglas 32H, an unsaturated general purpose polyester resin activated with 1% N, N, Dimethyl aniline and 1% DC-193 surfactant was employed. Resin was delivered to the spray gun tip by a Binks/Streach Hornet pump. The system was pressurized, with the catalyst pot at 50 psi and resin fluid pressure at approximately 800 psi. Catalyst and resin both sprayed in a normal manner and the resin cured normally. The catalyst and resin mixed very well and no appreciable difference was detected between this procedure and commercial procedures.

EXAMPLE 44

A mixture of 1700 grams of water, 417 grams of Tamol SN, a sodium salt of condensed naphthalene sulfonic acids manufactured by Rohm and Haas, and 5428 grams of Cadet BPO-70W, a particulate benzoyl peroxide manufactured by AKZO, Buffalo, N.Y., was added to a low shear mixer and mixed well. Thereafter, the mixture was slowly stirred for 30 minutes to let entrained air escape. The mixture was then placed in an Eppenbach disperser which operated at 3800 revolutions per minute until the temperature of the mixture reached 110° F. The mixture was then removed and stirred slowly to allow entrained air to be released during cooling. The process of subjecting the mixture to high shear mixing in the Eppenbach Mill followed by cooling was repeated three times. The mixture was then vacuum degassed and strained through an 80 mesh strainer. Viscosity of the dispersion using a number 3 spindle measured 150 centipoises at 5 revolutions per minute and 40 centipoises at 50 revolutions per minute.

The material separated out of suspension after several days standing undisturbed. The benzoyl peroxide particles went back into suspension with low shear mixing. Inspection with a microscope at 1000 magnification showed that most benzoyl peroxide particles were less than 10 microns, with a vast majority of same being a size of from about 3 to about 8 microns. The specific gravity of the dispersion was measured to be 1.15 and peroxide content was 50.4 percent by weight.

EXAMPLE 45

A mixture of 1700 grams of water, 420 grams of Tamol 731, and 5430 grams of BPO-78 Lucidol was added to a low shear mixer and mixed well. Thereafter, the mixture was slowly stirred for 30 minutes to let entrained air escape. The mixture was then placed in an Eppenbach disperser which operated at 3800 revolutions per minute until the temperature of the mixture reached 110° F. The mixture was then removed and stirred slowly to allow entrained air to be released during cooling. The process of subjecting the mixture to high shear mixing in the Eppenbach Mill followed by cooling was repeated three times. The mixture was then vacuum degassed and strained through an 80 mesh strainer. Viscosity of the dispersion using a number 3 spindle measured 140 centipoises at 5 revolutions per minute and 45 centipoises at 50 revolutions per minute. The material separated out of suspension after several days standing undisturbed. The benzoyl peroxide particles went back into suspension with low shear mixing. Inspection with a microscope at 1000 magnification showed that most benzoyl peroxide particles were less than 10 microns, with a vast majority of same being a size of from about 3 to about 8 microns. The specific gravity of the dispersion was measured to be 1.14 and peroxide content was 50.2 percent by weight.

EXAMPLE 46

A mixture of 1700 grams of water, 110 grams of Cab-o-sil, and 5430 grams of Cadet BPO-70W was added to a low shear mixer and mixed well. Thereafter, the mixture was slowly stirred for 30 minutes to let entrained air escape. The mixture was then placed in an Eppenbach disperser which operated at 3800 revolutions per minute until the temperature of the mixture reached 110° F. The mixture was then removed and stirred slowly to allow entrained air to be released during cooling. The process of subjecting the mixture to high shear mixing in the Eppenbach mill followed by cooling was repeated three times. This material foamed more than those of Examples 44 and 45.

The material was vacuum degassed and strained through an 80 mesh strainer. Viscosity of the dispersion using a number 3 spindle measured 2000 centipoises at 5 revolutions per minute and 600 centipoises at 50 revolutions per minute. The sample was still foamy.

The material separated out of suspension after several days standing undisturbed. The benzoyl peroxide particles went back into suspension with low shear mixing. Inspection with a microscope at 1000 magnification showed that most particles were less than 20 microns, with a vast majority of same being a size of from about 5 to about 10 microns. The specific gravity of the dispersion was measured to be 1.10 and peroxide content was 50 percent by weight.

EXAMPLE 47

Five thousand grams of the dispersion prepared as in Example 44 was mixed with 1065 grams of $NaH_2PO_4$. The mixture was allowed to stand overnight to remove entrained air. Benzoyl peroxide content was 41 percent by weight. The specific gravity was measured to be 10.97 pounds/gallon. Viscosity of the mixture using a number 3 spindle measured 230 centipoises at 100 revolutions per minute and 1100 centipoises at 10 revolutions per minute.

The material was placed in the catalyst container of a fiberglass spray-up unit manufactured by Magnum Industries, Clearwater, Fla. An unsaturated polyester resin supplied by Freeman Chemical, Port Washington, Wis., was placed under the resin pump of the spray-up unit. The system was then used to spray up parts in a typical fiberglass fabrication manner.

EXAMPLE 48

Five thousand grams of the dispersion prepared as in Example 45 was mixed with 900 grams of $K_2HPO_4$. The mixture was allowed to stand overnight to remove entrained air. A hysteresis was noted. The viscosity of the material increased on standing but was reduced when mixed. For a well-mixed sample viscosity using a number 3 spindle measured 220 centipoises at 100 revolutions per minute and 1475 centipoises at 10 revolutions per minute. Benzoyl peroxide content was 40.4 percent by weight. The specific gravity was measured to be 10.7 pounds/gallon.

The material was placed in the catalyst container of a fiberglass spray-up unit manufactured by Magnum Industries, Clearwater, Fla. An unsaturated polyester resin supplied by Freeman Chemical, Port Washington, Wis., was placed under the resin pump of the spray-up unit. The system was then used to spray up parts in a typical fiberglass fabrication manner.

EXAMPLE 49

Five thousand grams of the dispersion prepared as in Example 46 was mixed with 1000 grams of $NaHPO_4$. The mixture was allowed to stand overnight to remove entrained air. The viscosity using a number 3 spindle measured 245 centipoises at 100 revolutions per minute and 1500 centipoises at 10 revolutions per minute. Benzoyl peroxide content was 40.1 percent by weight. The specific gravity was measured to be 10.91 pounds/gallon.

The material was placed in the catalyst container of a fiberglass spray-up unit manufactured by Magnum Industries, Clearwater, Fla. An unsaturated polyester resin supplied by Freeman Chemical, Port Washington, Wis., was placed under the resin pump of the spray-up unit. The system was then used to spray up parts in a typical fiberglass fabrication manner.

EXAMPLE 50

Three hundred gram samples of each of the benzoyl peroxide dispersions prepared in each of Examples 47, 48 and 49, respectively, were stored in plastic containers and allowed to stand for 180 days in the laboratory.

Each sample showed little or no separation. Each sample displayed an increased viscosity which returned to its respective original value upon mixing.

What is claimed is:

1. An improved organic peroxide dispersion comprising:
   a) from about 35 to about 70 weight percent of solid organic peroxide having a particle size of 10 microns or less;
   b) from about 65 to 30 weight percent water;
   c) a dispersant, said dispersant being inert as to said peroxide and at least water dispersible and producing a dispersion having a predetermined viscosity of at least 100 centipoises when measured with a Brookfield RVT viscometer using a No. 3 spindle at 50 revolutions per minute; and
   d) a defoamer.

2. An improved organic peroxide dispersion comprising:
   a) from about 35 to about 70 weight percent of solid organic peroxide having a particle size of 10 microns or less;
   b) from about 65 to 30 weight percent water;
   c) a dispersant, said dispersant being inert as to said peroxide and at least water dispersible and producing a dispersion having a predetermined viscosity of at least 100 centipoises when measured with a Brookfield RVT viscometer using a No. 3 spindle at 50 revolutions per minute; and
   d) an acidic inorganic salt that dissolves in the water phase, increases the specific gravity of the dispersion, and upon drying down of the dispersion, retains water of hydration, whereby the flammable and explosive nature of the peroxide is diminished.

3. An organic peroxide dispersion as defined in claim 2, wherein said salt is selected from the group consisting of $NaH_2PO_4$, $Na_2HPO_4$, $NaHSO_4$, $AlCl_3$ and mixtures of same.

4. An improved organic peroxide dispersion comprising:

a) from about 35 to about 70 weight percent of solid organic peroxide having a particle size of 10 microns or less;
b) from about 65 to 30 weight percent water; and
c) a dispersant, said dispersant being inert as to said peroxide and at least water dispersible and producing a dispersion having a predetermined viscosity of at least 100 centipoises when measured with a Brookfield RVT viscometer using a No. 3 spindle at 50 revolutions per minute; and
d) a blowing agent.

5. An organic peroxide dispersion as defined in claim 4, wherein the blowing agent is a salt that liberates carbon dioxide.

6. An organic peroxide dispersion as defined in claim 5, wherein the blowing agent is selected from the group consisting of carbonates and bicarbonates of group I, II and III metals and mixtures of same.

7. An organic peroxide aqueous dispersion comprising:
a) from about 35 to about 70 weight percent of solid organic peroxide particles, said particles having a size of about 10 microns or less;
b) water;
c) a dispersant, said dispersant being inert as to the peroxide and being at least water dispersible;
d) a defoamer; and
e) a water soluble inorganic acidic salt which is inert as to the peroxide, increases the viscosity of the dispersion, retains water of hydration upon dry down of the dispersion and possesses fire retardant properties.

8. An organic peroxide as defined in claim 7, wherein the peroxide is benzoyl peroxide.

9. An organic peroxide dispersion as defined in claim 7, wherein the soluble salt is a member selected from the group consisting of $NaH_2PO_4$, $Na_2HPO_4$, $NaHSO_4$, $AlCl_3$ and mixtures of same.

10. An organic peroxide as defined in claim 7, comprising further a blowing agent.

11. An organic peroxide dispersion as defined in claim 10, wherein the blowing agent is a member selected from the group consisting of carbonates and bicarbonates of group I, II and III metals.

12. An improved aqueous dispersion of an organic peroxide comprising:
a) from about 35 to about 70 weight percent of particulate organic peroxide, said particles having a size of about 10 microns or smaller;
b) from about 65 to about 30 weight percent water;
c) from about 1 to about 7 weight percent of a dispersant, said dispersant being inert as to the peroxide and at least water dispersible;
d) a defoamer; and
e) a water soluble acidic inorganic salt that is inert as to the peroxide, increases specific gravity of the dispersion and retains water of hydration upon drying down of the dispersion.

13. An organic peroxide dispersion as defined in claim 12, wherein the peroxide is selected from the group consisting of benzoyl peroxide, lauroyl peroxide, di-cumyl peroxide, dicetyl peroxydicarbonate and mixtures of same.

14. An organic peroxide dispersion as defined in claim 12, wherein the water soluble inorganic salt is selected from the group consisting of $NaH_2PO_4$, $Na_2HPO_4$, $NaHSO_4$, $AlCl_3$ and mixtures of same.

15. An organic peroxide dispersion as defined in claim 12, comprising further a blowing agent.

16. An organic peroxide dispersion as defined in claim 15, wherein the blowing agent is selected from the group consisting of carbonates and bicarbonates of group I, group II and group III metals and mixtures of same.

* * * * *